United States Patent

Dickerson

[11] Patent Number: 5,178,546
[45] Date of Patent: Jan. 12, 1993

[54] CONTACT APPARATUS FOR COUPLING TERMINALS WHICH MOVE WITH RESPECT TO ONE ANOTHER

[75] Inventor: Chet S. Dickerson, Roanoke, Va.
[73] Assignee: ITT Corporation, N.Y.
[21] Appl. No.: 810,383
[22] Filed: Dec. 19, 1991
[51] Int. Cl.⁵ .................................... H01R 39/00
[52] U.S. Cl. ............................. 439/13; 439/17; 439/819
[58] Field of Search .............. 439/17, 19, 25, 26, 439/28, 29, 819, 821, 824, 23, 13

[56] References Cited

U.S. PATENT DOCUMENTS

| | | | |
|---|---|---|---|
| 4,372,633 | 2/1983 | Allen et al. | 439/17 |
| 4,758,172 | 7/1988 | Richards et al. | 439/212 |
| 4,867,696 | 9/1989 | Demler, Jr. et al. | 439/212 |
| 4,886,468 | 12/1989 | Harton et al. | 439/212 |

Primary Examiner—Gary F. Paumen
Attorney, Agent, or Firm—Arthur L. Plevy

[57] ABSTRACT

An electrical contact apparatus having a first set of roller contacts and a second set of plate contacts separately positioned on surfaces that move relative to one another. The roller contacts have conductive rollers that are electrically coupled to a terminal. The plate contacts have flat conductive surfaces that are coupled to opposing terminals. As the roller contacts are moved past the plate contacts, the conductive rollers abut against, and roll along, the flat conductive surfaces of the plate contacts; thus completing the desired circuit.

15 Claims, 5 Drawing Sheets

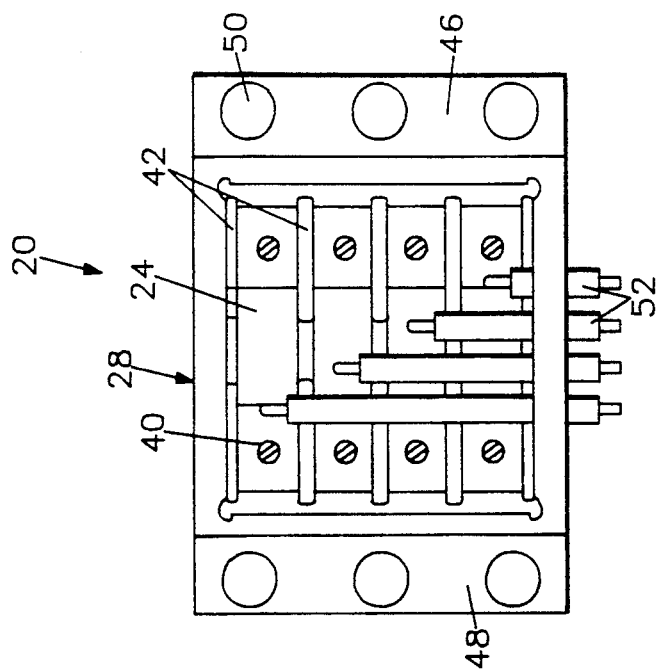
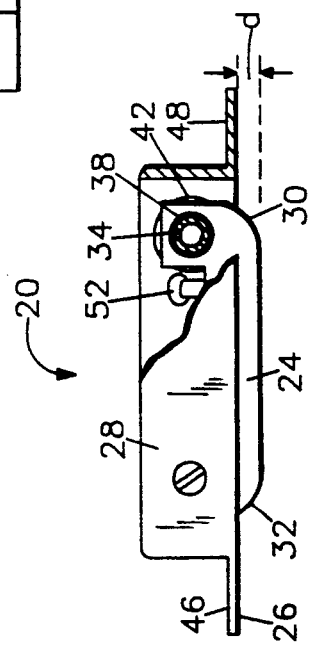
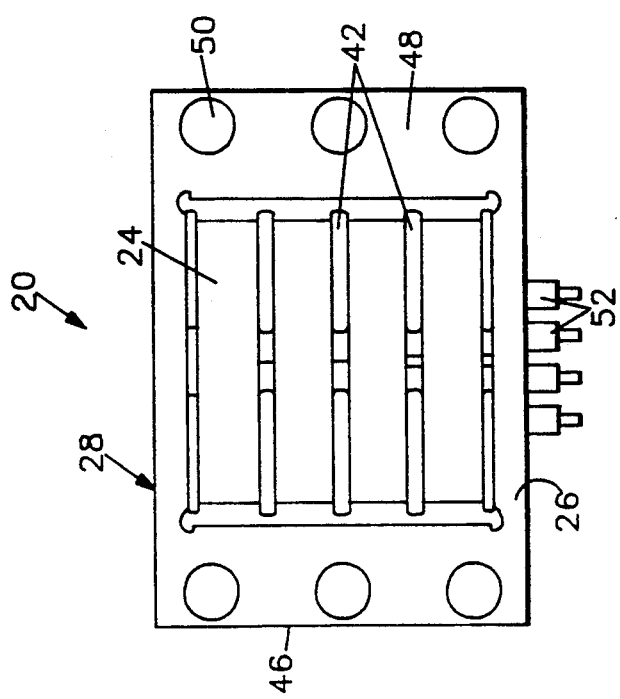

CONTACT APPARATUS FOR COUPLING TERMINALS WHICH MOVE WITH RESPECT TO ONE ANOTHER

FIELD OF THE INVENTION

The present invention relates to contact assemblies that maintain an electrical connection between stationary and moving terminals, and more particularly to such contacts that couple stationary terminals to contacts on a workpiece positioned on a rotating platform.

BACKGROUND OF THE INVENTION

There are contact assemblies that couple stationary terminals to moving terminals which assemblies are used where there is relative movement between terminals. In applications where the relative movement between the stationary and moving terminals is rotational, brush contacts are commonly used to maintain an electrical connection. In such rotational applications the gap between the two terminals remains constant even though one terminal is stationary and the other terminal is moving. The brush contacts, often called bank-and-wiper contacts or rotary contacts, bridge the gap between terminals utilizing a conductive element such as a flexible copper finger that extends from one terminal conductively contacting the opposing terminal. During rotational movement the flexible copper finger wipes across the surface of the opposing terminal completing the electric circuit.

During manufacturing, many mass produced products are fabricated and/or tested utilizing automated or semi-automated equipment. It is commonplace for such automated equipment to include revolving platforms that guide products through various assembly or testing procedures. If it is necessary to couple the manufactured product to a power source or test lead, while positioned on the revolving table, brush contacts are often used.

Tradition brush contacts work by wiping action wherein the finger of the contact directly abuts against an opposing terminal as it rotates. The wiping action of the contacts create a great amount of wear on both the finger and surface. Excessive wear results in the need to readjust the finger or its contact surface to compensate for the wear and ensure a proper electrical contact. Similarly, the excessive wear causes debris which contaminates the area of the brush contact. The debris may cause electrical shorts, jam sensitive mechanical movements and require excessive preventative maintenance process.

The fingers of traditional brush contacts in rotary applications are formed so as to operate with only one direction of rotation. This is especially true on rotating tables, and other platforms, where the platform is designed to rotate in only one direction. However, rotating platforms sometimes jam or otherwise require attention. In such situations, it is possible, if not desirable, to rotate the platform in a direction opposite its normal mode of operation. Such a manipulation may help to unjam the machine, but the reverse rotation can bend and destroy traditional brush contacts. The damaged contact then needs to be replaced or repaired before the rotating platform can again function properly.

It is therefore a primary objective of the present invention to provide a contact assembly that can be used in place of traditional brush contacts that couple a rotating terminal to a stationary terminal with reduced wear, debris caused by wear, and the need for readjustment.

It is an additional object of the present invention to provide a contact assembly that is not dependent on the direction of rotation between terminals.

SUMMARY OF THE INVENTION

The present invention provides contact that maintain an electrical connection between stationary and moving terminals. More specifically, the preferred embodiments of the present invention contacts include a set of roller contacts and a set of plate contacts, each positioned on an associated surface which surfaces move relative to one another. Each roller contact has a conductive roller that is coupled to a terminal. Similarly, each plate contact is formed from conductive material and is coupled to an opposing terminal. As the sets of roller contacts are moved past a set of plate contacts, each roller abuts against, and rolls along the surface of a corresponding plate contact. Since both the roller and the plate contact are conductive, a circuit is completed between the roller contact terminal and the plate contact terminal. A plurality of the present invention contacts may be used at one time; consequently a plurality of stationary and moving terminals can be coupled at the same time.

The roller contacts roll over the plate contacts; as such there is a minimal amount of wear from friction that would otherwise occur between two contact surfaces. Additionally, the roller contacts are spring biased against the plate contacts so they self adjust against the plate contacts as both the roller contacts and plate contact surfaces wear. Roller contacts also have the advantage of not being dependent upon the direction of rotation. The plate contacts are symmetrically formed so the roller contacts can travel over the plate contacts regardless of the direction of movement of the surfaces.

BRIEF DESCRIPTION OF THE FIGURES

For a better understanding of the present invention, reference may be had to the following description of an exemplary embodiment thereof, considered in conjunction with the accompanying drawings, in which:

FIG. 2 is a front view of one embodiment of a contact plate assembly component of the present invention;

FIG. 3 is a top view of the contact plate assembly shown in FIG. 2, the view is partially fragmented to reveal underlying elements and facilitate discussion;

FIG. 4 is a rear view of the contact plate assembly shown in FIGS. 2 and 3;

DESCRIPTION OF THE PREFERRED EMBODIMENT

Although the present invention can be used in many different applications where an electrical coupling is needed between stationary and moving terminals, it is especially suitable for use in coupling stationary terminals to terminals on a rotating platform or like device. Accordingly, the present invention will be described in accordance with a rotating platform typical of those commonly used in manufacturing equipment.

Figure 1:
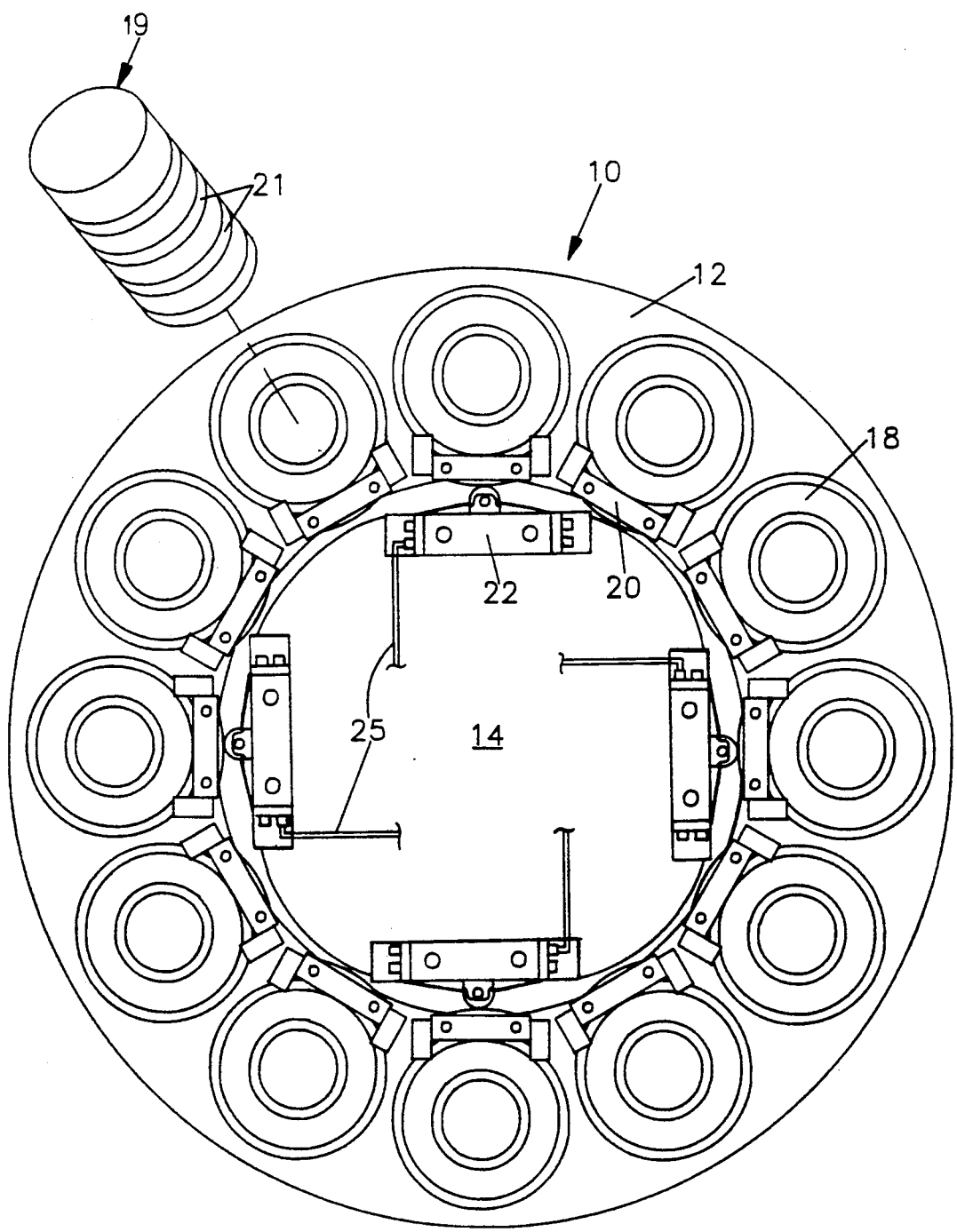
FIG. 1 is a top view of a rotating table having a stationary center whereon a plurality of electrical contacts are positioned.

Referring to FIG. 1, there is shown a top view of a rotating platform 10 having a revolving outer region 12 coaxially formed around a stationary center region 14. Symmetrically disposed along the outer region 12 are a plurality of base receptacles 18 that can be formed to hold any electrically operated or tested device. The outer region 12, and thus the base receptacles 18, rotate around the stationary center region 14. Consequently, the rotating platform can be used to advance a device, positioned in the base receptacles 18, through any appropriately adapted automated assembly or testing procedure. The present invention addresses the plate contact assemblies 20, positioned on the base receptacles 18, and the roller contact assemblies 22, positioned on the stationary center 14. The plate contact assemblies 20 and the roller contact assemblies 22 are used to create an electrical connection between terminals on the stationary center 14 and any device held within the base receptacles, 18 as the base receptacles 18 revolve around the stationary center 14.

In the embodiment shown, the rotating platform 10 is used in the automated testing of image intensifier tubes 19, such as the Generation III image intensifier tube manufactured by International Telephone and Telegraph Inc., the assignee herein. An example of a Generation III image intensifier tube and its application can be seen in U.S. Pat. No. 5,029,963 to Naselli et al, entitled REPLACEMENT DEVICE FOR A DRIVER'S VIEWER and also assigned to International Telephone and Telegraph Inc.

The Generation III image intensifier tube 19 is manufactured with its operational leads 21 positioned along its exterior surfaces. Terminals (not shown) are formed in the base receptacles 18, so that when an image intensifier tube 19 is placed into a base receptacle 18, the operational leads 21 of the image intensifier tube 19 electrically contact the terminals.

Each base receptacle 18 is attached to a corresponding contact plate assembly 20. The contact plate assembly 20 is directly coupled to the terminals formed within base receptacles 18. As such, when an image intensifier tube is positioned within a base receptacle 18 there exists a direct electrical connection between the contact plate assembly 20 and the operational leads 21 of the image intensifier tube. The contact plate assemblies 20 from each base receptacle 18 are positioned to face the stationary center 14 of the rotating platform. Positioned on the stationary center 14, opposite the contact plate assemblies 20, are a plurality of roller contact assemblies 22. The roller contact assemblies 22 extend beyond the diameter of the stationary center region 14 and partially interfere with the position of the contact plate assemblies 20, when the contact plate assemblies 20 are rotated past the roller contact assemblies 22. The overlapping of positions between the roller contact assemblies 22 and the contact plate assemblies 20 causes contact between the roller contact assemblies 22 and the contact plate assemblies 20, as the rotating platform 10 revolves. Consequently, when the roller contact assemblies 22 engage the contact plate assemblies, an electrical connection is completed. The electrical connection between the stationary roller contact assemblies and the revolving plate contact assemblies allows the image intensifier tube 19, held within a base receptacle 18, to be electrically connected to a stationary source such as test equipment or the like.

The present invention contact apparatus will be best understood if each of the present invention components are first described separately and then in unison. The first part of the present invention contacts is the contact plate assembly 20. Referring to FIGS. 2-4, a single contact plate assembly 20 can be described. In the shown embodiment, each contact plate assembly 20 is formed with four contact plates 24. Each contact plate 24 is made from a highly conductive material such as copper and extends a distance "d" beyond the forward face 26 of the plate assembly housing 28. The ends 30, 32 of each contact plate 24 taper toward the face surface 26 of the plate assembly housing 34, creating a smooth transition from the face surface 26 to the surface of the contact plates 24 at distance "d".

Each contact plate 24 is held within the plate assembly housing 28 by ceramic rods 34 that pass through orifices 38 in the contact plates 24. The contact plates 24 each have an optional set of lock screws 40 that allow the contact plates 24 to be locking into position along the ceramic rods 34. Ceramic spacers 42 are positioned around the ceramic rods 34 adjoining each contact plate 24. The ceramic spacers prevent the contact plates 24 from touching each other or the plate assembly housing 28, should the lock screws 40 not be used or become loose.

Two flanges 46, 48 are formed as part of the plate assembly housing 28. Each flange 46, 48 having a plurality of mounting holes 50 through which the plate assembly housing 28 can be affixed to a base receptacle 18 (see FIG. 1), utilizing mechanical fasteners such as bolts or the like. The base receptacle 18 can be formed to hold any electrically operated or tested device. However, in the exemplary embodiment of the present invention shown in FIG. 1, the contact plate assembly 20 is mounted on a base receptacle 18 that is formed to retain a Generation III image intensifier tube 19. During testing, a Generation III image intensifier tube has four leads that must be coupled to test equipment. As such, four contact plates 24 on the contact plate assembly 20 are needed; one contact plate 24 for each of the four leads originating from the image intensifier tube 19. Each contact plate 24 is coupled to the base receptacle 18 via a lead wire 52. The image intensifier tube 19 is held within the base receptacle 18 so that each contact plate 24 of the contact plate assembly 20 is electrically coupled to a separate lead of the image intensifier tube 19. From this example it should be obvious to someone skilled in the art that the number of contact plates 24 used in the contact plate assembly 20 is entirely dependent upon the number of leads that need to be coupled, and any plurality of contact plates 24 may be used.

Figure 5:
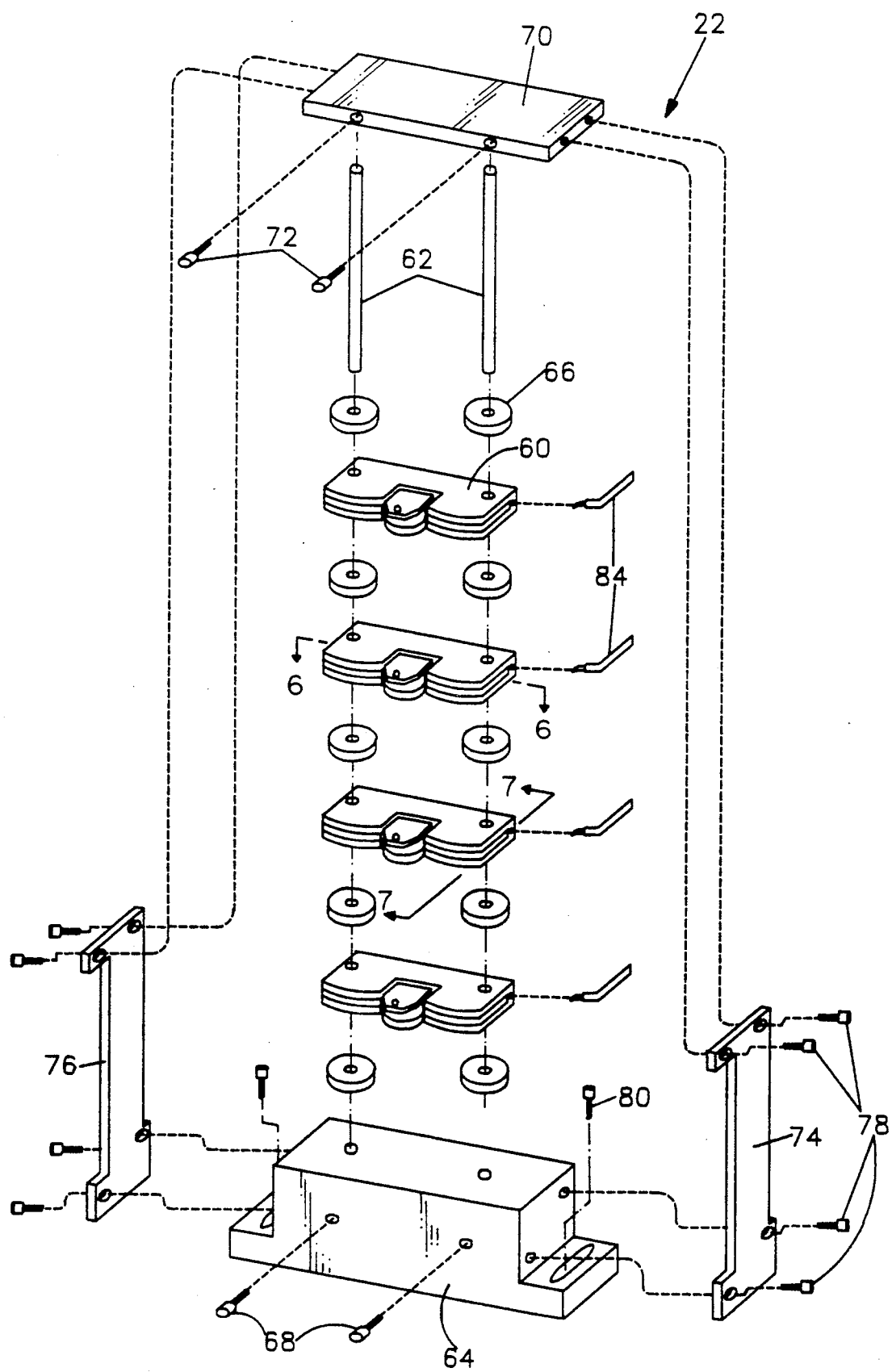
FIG. 5 is an exploded perspective view of one embodiment of the roller contact assembly component according to the present invention.

The second component of the present invention contacts are the roller contact assemblies 22. Referring to FIG. 5 there is shown a roller contact assembly 22 including four roller contacts 60. Ceramic rods 62 pass through orifices 64 in each roller contact 60, attaching each roller contact 60 to a base member 64. Each roller contact 60 is adjoined on each side by a pair of ceramic washers 66 through which the ceramic rods 62 also pass. The ceramic washers prevent the roller contacts 60 from touching each other or the base member 64. The ceramic rods 62 pass into the base member 64 and are held in place by locking screws 68. Similarly, the other end of the ceramic rods pass into a cap member 70 and are also held in place by locking screws 72. The cap member 70 is supported by side members 74, 76 that are affixed to both the cap member 70 and the base member 64 with mechanical fasteners 78. The roller contact assembly 22 is attached to the peripheral edge of the stationary center 14 of the rotational table 10 (see FIG. 1) by mechanical fasteners 80 that pass through slotted orifices 82 in the base member 64. The slotted orifices 82 permitting the position of the roller contact assembly 22 to be adjusted on the stationary center region 14 of the rotating platform 10.

Figure 6:
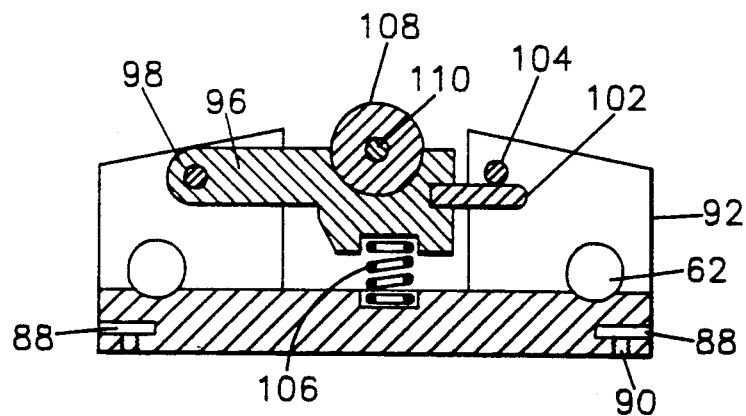
FIG. 6 is a cross-sectional view of a single roller contact as depicted in FIG. 5 taken along section line 6—6.
Figure 7:
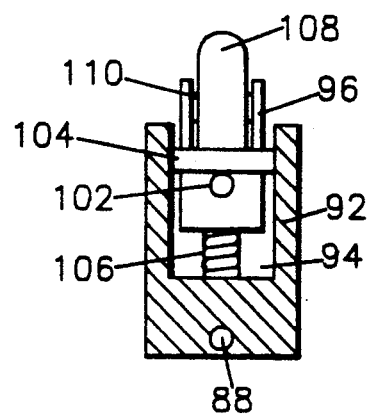
FIG. 7 is a cross-sectional view of a single roller contact as depicted in FIG. 5 taken along section line 7—7.

Each roller contact 60 is coupled to a wire lead 25 that passes into the roller contact 60 through a lead orifice 88. Referring to FIGS. 6–7 in conjunction with FIG. 5, it can be seen that the lead orifice 88 has a locking screw hole 90 adjoining it through which a locking screw (not shown) can pass; thus retaining the wire lead 25 in the lead orifice 88. The lead orifice 88 is formed in the contact housing 92 which is formed from an electrically conductive material. The contact housing 92 has a U-shaped profile (see FIG. 7) defining a central slot 94. Pivotally attached to the contact housing 92 in the central slot 94 is a lever member 96. The lever member 96 is fabricated from a conductive material and is pivotally connected to the contact housing 92 by a conductive pivot pin 98 such that the lever member 96 and the contact housing 92 are electrically coupled. A finger member 102 extends from the lever member 96 opposite the pivot pin 98. The lever member 96 is prevented from rotating out of central slot 94 of the contact housing 92 by the abutment of the finger member against a cross pin 104. A spring 106 is positioned between the lever member 96 and the contact housing 92, biasing the finger member against the cross pin 104.

A roller wheel 108 is affixed to the lever member 96 and extends out of the central slot 94 beyond the height of the contact housing 92. The roller wheel 108 is formed from a conductive material and rotates around a central conductive axle 110. The central conductive axle 110 electrically couples the roller wheel 108 to the lever member 96 and the contact housing 92. The roller wheel 108 is biased in its position by the spring 106, any force on the roller wheel 108 toward the contact housing 92, drives the lever member 96 further into the central slot 94 of the contact housing 92; thus further compressing the spring 106.

Figure 8:
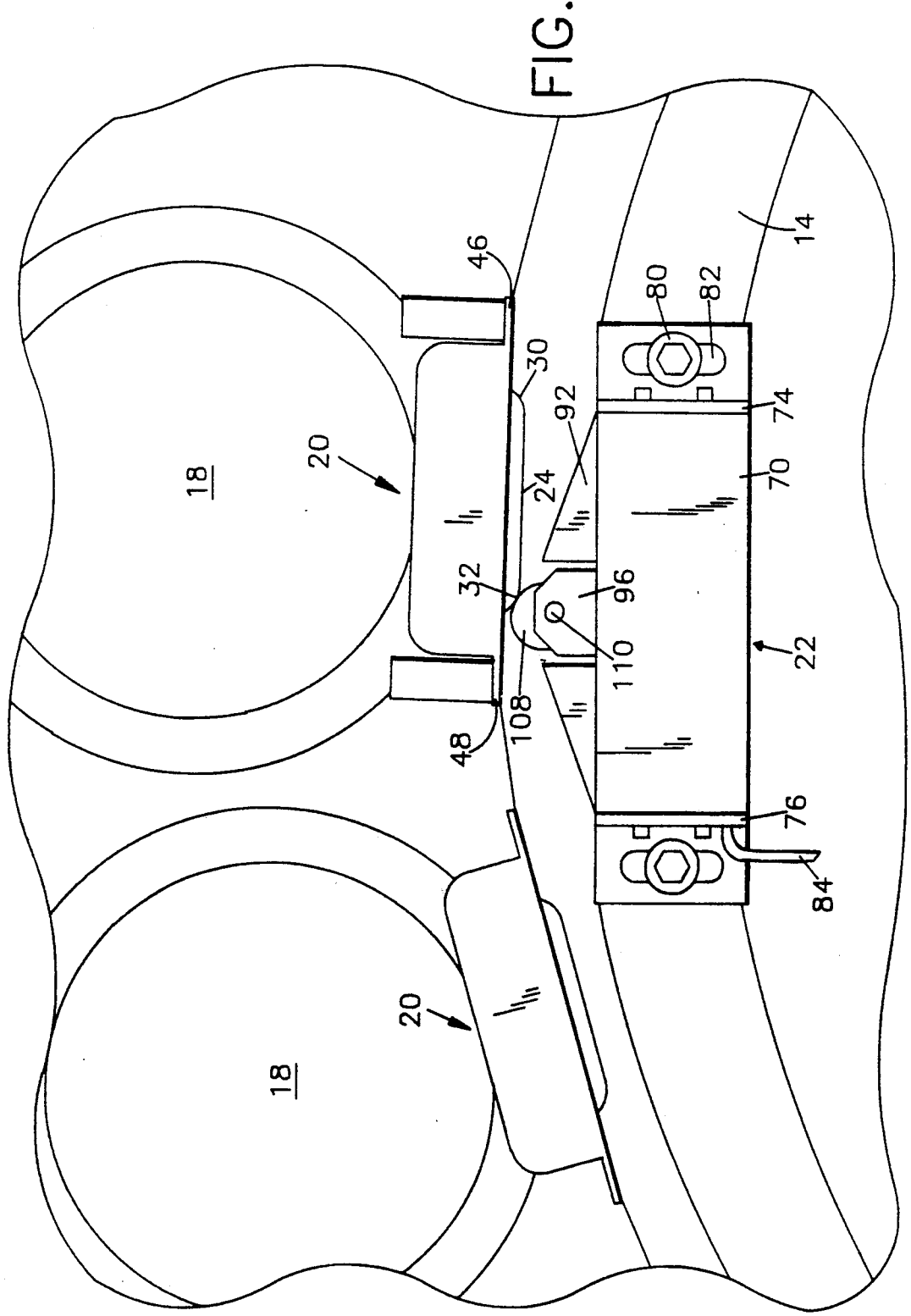
FIG. 8 is an enlarged top view of a section of the rotating table of FIG. 1 showing the interrelation of a roller contact assembly and a contact plate assembly.

The operation of the present invention contacts is best described by referring to FIG. 8. In FIG. 8 there is shown an enlarged portion of FIG. 1 wherein a roller contact assembly 22 is positioned on the stationary central region 14 around which the plurality of base receptacles 18 and contact plate assemblies 20 rotate. In operation, the roller contact assembly 22 is affixed in position to the stationary center 14 via mounting bolt 80 and slotted orifices 82, such that the roller wheel 108 interferes in position with the rotating contact plates 24 of the contact plate assemblies 20. As the contact plate assemblies 20 move past the roller contact assemblies 22, the four roller wheels 108 contacts the four contact plates 24. Each roller wheel 108 follows the contours of the corresponding contact plate 24, riding up the tapered edge 32 of the contact plate 24 to its top surface. The contact with the contact plates 24 causes the roller wheel 108 to move against its own spring bias and partially retreat into the contact housing 92.

Each roller wheel 108 in the contact roller assembly 22 is connected to test equipment or the like via a lead wire 25. Both the roller wheels 108 and the contact plates 24 are formed from highly electrically conductive materials; consequently the contact of a roller wheel 108 to a contact plate 24 electrically couples the contact plate 24 with the referenced test equipment.

As has been described previously, the contact plates 24 are electrically coupled to the base receptacles 18. As such, the contact of the roller wheels 32 against the contact plates 24, couples the rotating base receptacles 18 to the test equipment that is connected to roller contact assembly 22. Each roller wheel 108 and corresponding contact plate 24 are electrically insulated from all other roller wheels 108 and contact plates 24 respectively. The contact of one roller wheel 108 against one contact plate 24 completes a single isolated circuit. Consequently, the number of roller contacts 60 in the roller contact assembly 22 and the number of contact plates 24 in the contact plate assembly 20 are governed by the need for coupling separate circuits.

The roller wheel 108 rolls along the contours of the contact plate 24. The rolling action reduces wear, due to friction, since the roller wheel 108 does not drag across the contact plate 24 like prior art brush contacts. Additionally, the rolling action of the roller wheel 108 over the contact plate 24 is not directionally dependent; consequently the contact plates 24 can be rotated past the roller wheel 108 in either direction without damage.

It will be understood that the embodiment described herein is merely exemplary and that a person skilled in the art may make many variations and modifications without departing from the spirit and scope of the invention. More particularly, many of the individual components used in the exemplary embodiment have well known mechanical equivalents. It should also be understood that although the present invention electrical contacts are exemplified in application on a rotating table with a stationary center, the present invention electrical contacts can be used in any application where it is desired to couple electrical leads that move relative to one another. All such modifications and variations are intended to be included within the scope of the invention as defined in the appended claims.

What is claimed is:

1. A contact for creating an electrical connection between at least one first and second terminal that mvoe relative to one another, comprising:
    at least one conductive member coupled to a corresponding said first terminal; and
    at least one conductive roller supported on at least one pivot arm member that is biased into a set position allowing said at least one conductive pivot arm member that is biased into a set position allowing said at least one doncutive roller to contact and roll along said at least one conductive member as said at least one conductive roller moves past said at least one conductive surface, said pivot arm member being coupled to said at least one second terminal, thereby electrically interconnecting said at least one conductive roller to said at least one second terminal.

2. The contact of claim 1, wherein said pivot arm member is biased into said set position by a spring member, thereby causing said at least one conductive roller to be spring biased against said at least one conductive member as said at least one conductive roller rolls over said at least one conductive member.

3. The contact of claim 2 wherein said at least one conductive member has a contoured protruding surface thereon over which said at least one conductive roller travels, said at least one conductive roller conforming to said contoured protruding surface as it roller thereover.

4. The contact of claim 2 wherein said at least one conductive roller extends from a housing means, said housing means being positionally adjustable relative said at least one conductive member.

5. The contact of claim 3 wherein a plurality of conductive rollers extend from said housign means, each said conductive roller being electrically insulated from each another.

6. The contact of claim 5 including a plurality of conductive members, said plurality of conductive members being electrically insulated from each other and corresponding in both number and position with said plurality of conductive rollers such that each of said plurality of conductive rollers contacts a corresponding one of said plurality of said conductive members simultaneously, as said plurality of conductive rollers pass over said plurality of conductive members.

7. The electrical contacts of claim 6 wherein said plurality of conductive rollers are stacked atop one another in parallel, each of said plurality of conductive rollers being separated by a first insulating means.

8. The electrical contacts of claim 7 wherein said plurality of conductive members are stacked atop one another in parallel, each of said plurality of conductive rollers being separated by a second insulating means.

9. A roller contact device comprising:
a conductive contact housing having at least one coupling means attached thereto, a pivot arm pivotally connected to said contact housing, a freely rotatable conductive roller supported by said pivot arm and extending beyond one surface of said contact housing, said conductive roller being attached to said pivot arm in an electrically conductive manner coupling said conductive roller to said contact housing, and an attachment means for attaching said contact housing to a desired surface.

10. The device of claim 9 wherein said conductive roller is spring biased into a set position by a spring bias means.

11. The device of claim 10, wherein said spring bias means is a spring positioned between said pivot arm and said contact housing, said spring biasing said conductive roller into said set position.

12. The device of claim 11 wherein said coupling means is at least one orifice formed into said contact housing, said orifice having a locking means therein so a wire lead can be held within said orifice.

13. The device of claim 12 wherein said conductive roller revolves around a central axle supported by said pivot arm, said central axis and said pivot arm being formed from conductive material so as to electrically couple said conductive roller to said contact housing.

14. The device of claim 13 wherein said attachment means includes at least one aperture formed through said contact housing.

15. The device of claim 9, further including a limiting means for preventing said conductive roller from extending from said contact housing beyond said set position.

* * * * *